(12) United States Patent
Prior et al.

(10) Patent No.: US 6,349,220 B1
(45) Date of Patent: Feb. 19, 2002

(54) RADIOTELEPHONE HANDSET

(75) Inventors: Sean Prior; Graham Thomas, both of Surrey (GB)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/179,771

(22) Filed: Oct. 27, 1998

(30) Foreign Application Priority Data

Oct. 31, 1997 (GB) ............................................. 9723086

(51) Int. Cl.[7] ................................................. H04B 1/38
(52) U.S. Cl. ........................... 455/566; 455/90; 455/575
(58) Field of Search .......................... 455/90, 575, 566, 455/550; 379/433, 434; D14/137, 138; 345/161, 163, 167, 168, 169, 173, 156

(56) References Cited

U.S. PATENT DOCUMENTS

| | | | |
|---|---|---|---|
| 4,059,728 A | 11/1977 | Milkes ........................ | 179/2 E |
| 5,138,329 A | 8/1992 | Saarnimo et al. ........... | 343/702 |
| 5,168,982 A | 12/1992 | Hakanen et al. ............ | 200/342 |
| 5,610,971 A | 3/1997 | Vandivier ..................... | 379/58 |
| 5,692,032 A | 11/1997 | Seppanen et al. ............. | 379/59 |
| 5,794,142 A | 8/1998 | Vanttila et al. .............. | 455/419 |
| 5,841,849 A | * 11/1998 | Macor ......................... | 379/433 |
| 5,852,783 A | * 12/1998 | Tabe et al. ................... | 455/566 |
| 5,937,360 A | * 8/1999 | Nishiyama et al. ......... | 455/566 |
| 5,966,671 A | * 10/1999 | Michell et al. ............. | 455/575 |
| 5,987,336 A | * 11/1999 | Sudo et al. .................. | 455/566 |

FOREIGN PATENT DOCUMENTS

| | | |
|---|---|---|
| EP | 0463856 A2 | 1/1992 |
| EP | 0844772 A1 | 5/1998 |
| WO | WO 93/12604 | 6/1993 |

OTHER PUBLICATIONS

United Kingdom Search Report.

* cited by examiner

*Primary Examiner*—Nay Maung
*Assistant Examiner*—Quochien B. Vuong
(74) *Attorney, Agent, or Firm*—Perman & Green, LLP

(57) ABSTRACT

A radiotelephone handset comprises a housing having a front and a rear face; and a user interface comprising a display (3) and input means (60) responsive to a user to manipulate the contents of the display (3). The display (3) is provided on the front face and the input means (60) on the rear face of the handset.

18 Claims, 10 Drawing Sheets

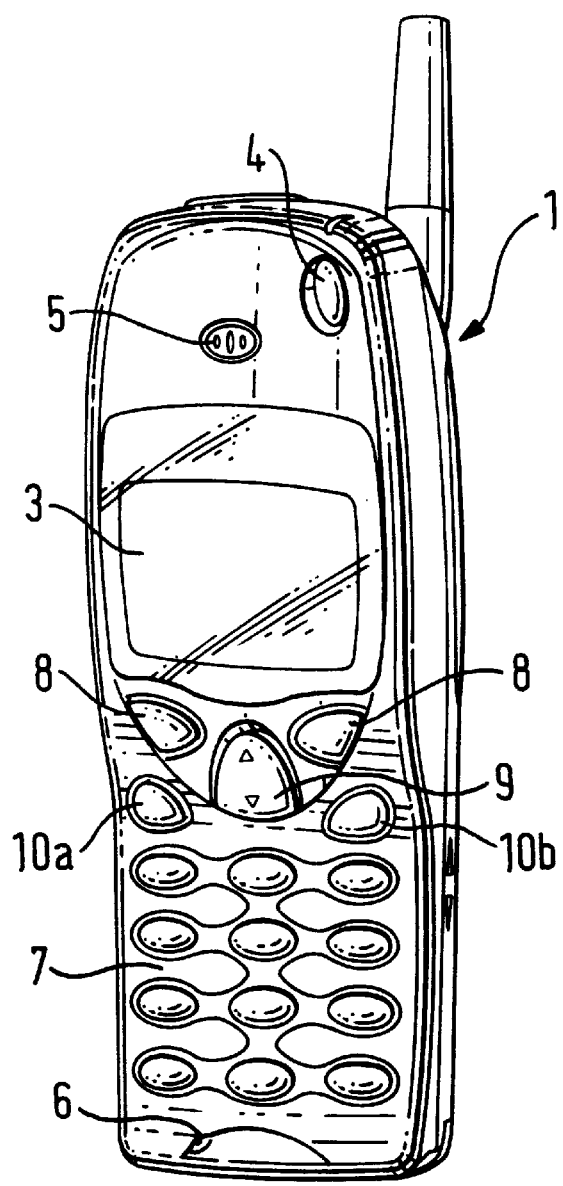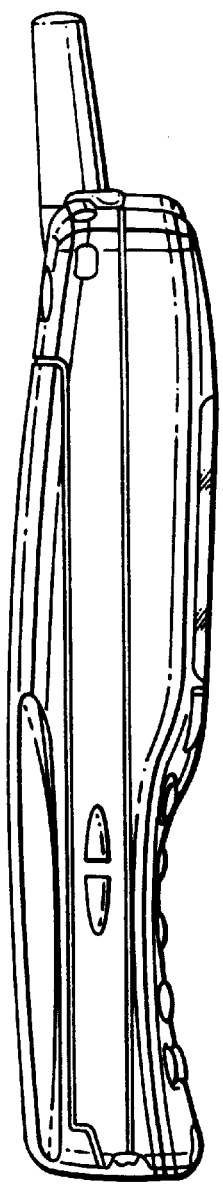
FIG.1
FIG.2

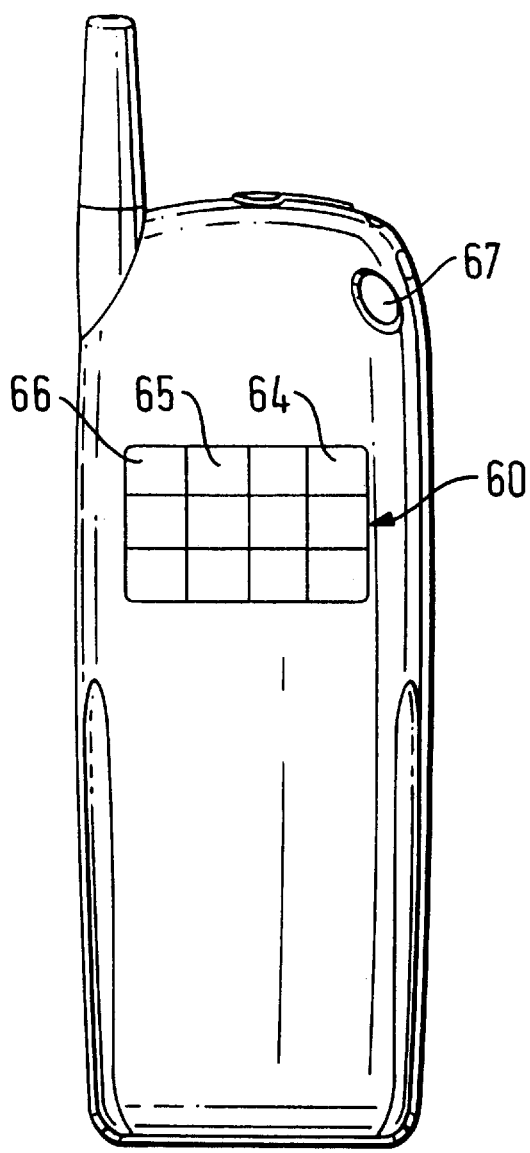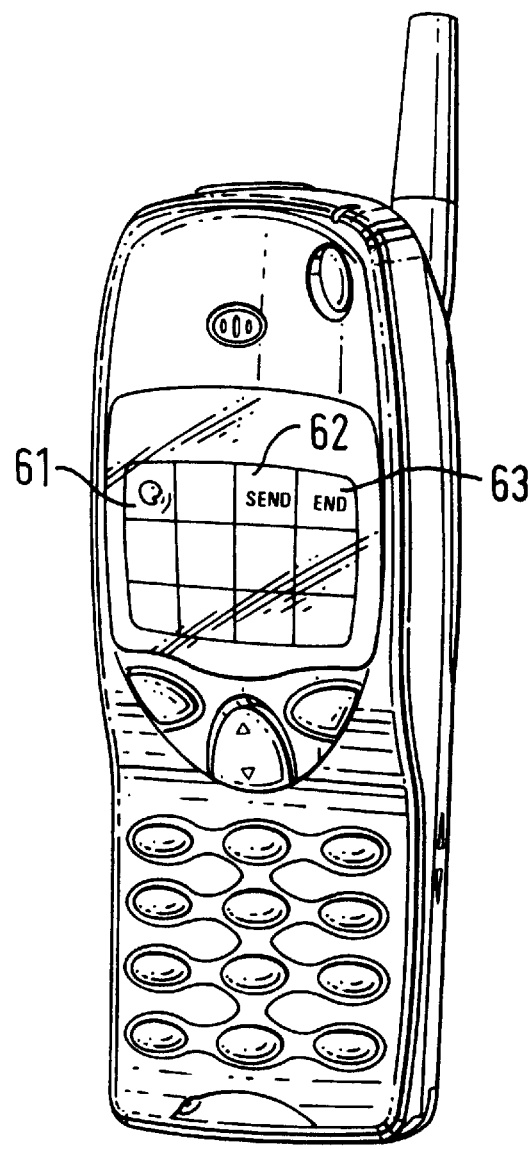
FIG. 6a
FIG. 6b

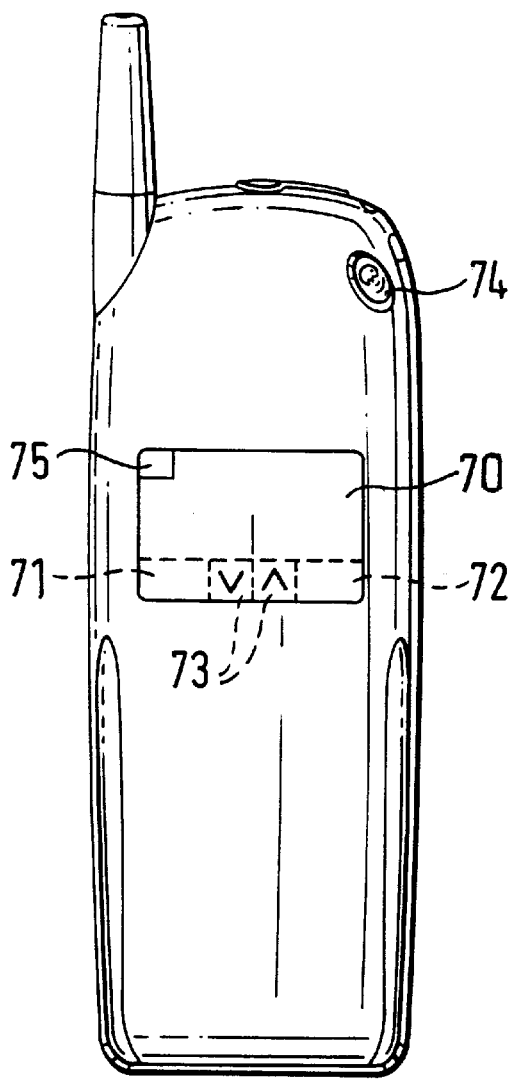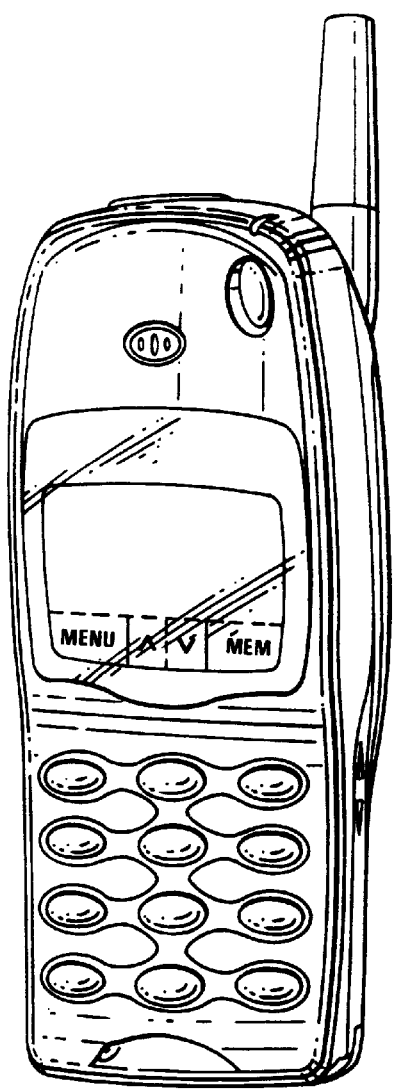
FIG. 7a
FIG. 7b

RADIOTELEPHONE HANDSET

BACKGROUND OF THE INVENTION

The invention relates to a radiotelephone handset and user interface thereto.

The user interface, i.e. those elements of the handset that interact with the user is of vital importance. Important user interface considerations include, the ease with which the phone can be operated, the ease with which it can be transported and the comfort of use.

In the past, emphasis has been placed on designing the front of a handset, making it smaller and designing relatively large displays that allow information to be clearly presented to a user. As handsets become smaller they are better adapted for single hand operation. With this comes a range of other considerations.

Single handed operation of a radio telephone has clear advantages. These can only be realised effectively if the user finds it comfortable to operate the telephone when it is held in one hand. As modern phones are becoming increasingly small it is for the phone designer to assist in design of the phone to promote single handed operation.

SUMMARY OF THE INVENTION

According to the present invention, there is provided a radiotelephone handset comprising a housing having a front and a rear face; and a user interface comprising a display and input means responsive to a user to manipulate the contents of the display; wherein the display is provided on the front face and the input means on the rear face.

The provision of the input means on the rear face of the handset promotes single handed operation. Furthermore, the user's hand does not obscure the display from view when, for example, making a menu selection. Moreover, such input means can perform the functions of the various function keys usually found on the front face of a handset.

The input means may manipulate text and/or cursors, for example by scrolling them on, off or across the display. The text may be numeric and/or alphabetic and may, for example, correspond to a function (such as a memory or menu function). The input means may select such a function displayed on the display. For example, the user may press the user input means to move a cursor to highlight a function displayed on the display, and once the requisite function is highlighted, the user may press the user input means again to select that function.

The input means may be a touch input means or touchpad, such as a touch screen, key or array of keys, mat having a pressure sensitve region or regions, rolling means (e.g. ball or wheel) or the like.

The input means may comprise a plurality of regions, each said region being responsive to the user to manipulate the contents of an associated region of the display. Preferably in such a case, each input region is positioned behind its associated display region.

Optionally, at least one of the touchpad (input means) regions is responsive to the user to select a function displayed in an associated display region. In such a case, the function displayed in a display region may be selected in response to pressure being removed from the associated touchpad region. Alternatively, it may be selected in response to pressure being applied to the associated touchpad region.

BRIEF DESCRIPTION OF THE DRAWINGS

The invention will now be described in greater detail with reference to FIGS. 1 to 11 of the drawings of which:

FIG. 1 is a perspective view of a radiotelephone handset;

FIG. 2 is a side view of the handset of FIG. 1;

FIGS. 6 to 11 illustrate radiotelephone handsets according to alternative embodiments of the present invention;

DETAILED DESCRIPTION OF THE INVENTION

Figure 3:
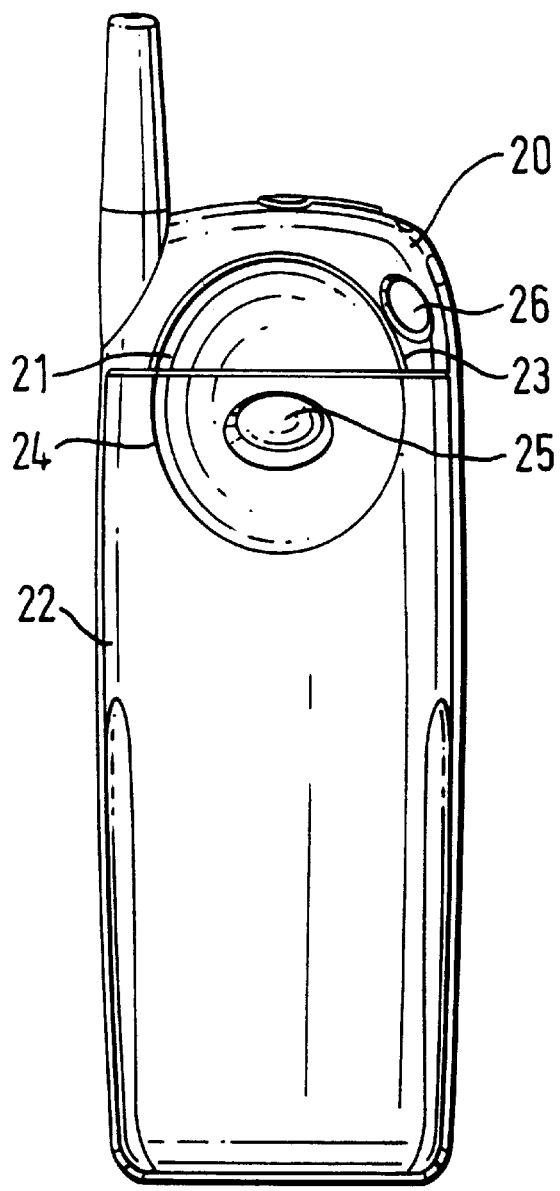
FIG. 3 is a rear view of the radiotelephone handset of FIG. 1 according to an embodiment of the present invention.

FIG. 1 shows a handset 1 according to an embodiment of the invention. The handset 1 comprises a user interface having a keypad 7, a display 3, an on/off button 4, an earpiece 5, and a microphone 6. The keypad has a first group 7 of keys in the form of alpha-numerical keys, by means of which the user can enter a telephone number, write a text message (SMS), write a name (associated with the telephone number), etc. The user uses the first group of keys primarily for entering data in the telephone (enter events).

The keypad additionally comprises a second group of keys which, in this embodiment, comprises operation keys 8 or soft keys whose function depends on the present state of the telephone. The default function or the present function of the operation key 8 is displayed in a predetermined area of the display 3. The second group of keys additionally comprises a scroll key 9 by means of which the user can scroll selectively from one item to the preceding or the succeeding item in the menu loop of the telephone, while he gets access to a submenu loop under the item concerned in the main menu loop by activation of the operation key. The keypad additionally has a send key 10*a* and an end key 10*b*, which respectively may be used for initiating and ending a call.

The handset may be used in connection with telephone networks, such as GSM and AMPS cellular networks and various forms of cordless telephone systems. A microphone records the user's speech, and the analog signals formed thereby are A/D converted in an A/D converter before the speech is encoded in an audio codec unit. The encoded speech signal is transferred to a physical layer processor, which, for example, supports the GSM terminal software. The processor also forms the interface to the peripheral units of the apparatus, including the display and the keypad (as well as SIM, data, power supply, RAM, ROM, etc.). The processor communicates with an RF part via a baseband converter and a channel equalizer.

The audio codec unit speech-decodes the signal, which is transferred from the processor to an earpiece via a D/A converter.

Figure 4:
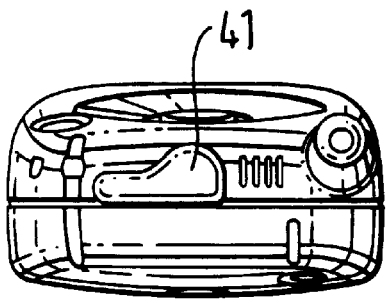
FIG. 4 is a top plan view of the handset of FIG. 1.
Figure 5:
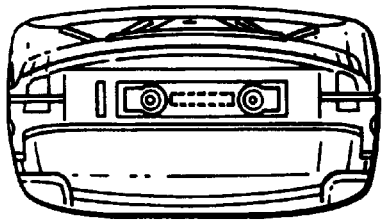
FIG. 5 is a bottom plan view of the handset of FIG. 1.

In this embodiment, the phone is also provided with a headset connector, the cover 41 for which can be seen in FIG. 4. When the headset is connected to the connector, the processor causes the decoded received speech signal to a loudspeaker of the headset, as opposed to the phone's earpiece. This provides improved privacy.

Moving user interface features from the front face of the handset to another face or faces enables the phone to be reduced in size, particularly in length. Moreover, it often results in an ergonomically improved handset. For example, keys placed on the rear of the handset assist single handed operation, enable more accurate operation as they are actuated using a finger instead of a thumb, and are more accessible when the user is in a call. Also, the user's view of the display is not hindered by the presence of a thumb across the front of the phone when selecting menu options, for example. Various types of user interface input means positioned off of the front face of the handset are exemplified in the accompanying drawings.

FIG. 3 illustrates the rear cover 20 of the handset shown in FIG. 1. A scooped recess 21 can clearly be seen located partly in the rear cover of the handset above a battery pack 22 and partly in the rear casing of the battery pack 22 and extending toward the top of the rear cover 20 of the handset 1. The scooped recess 21 is positioned substantially behind the handout's display 3 and in a position arranged to comfortably accommodate the user's fingers when the earpiece 5 of the handset is held to the user's ear.

The scoop is lateral confined by banks 23,24 within the margins of the rear cover of the handset and the battery pack. The addition of a scooped recess encourages the user to hold the phone in a particular way as the feel of the phone in the hand is enhanced if one of more of the user's fingers are placed in the scooped recess. The position of the scoop can be used to encourage the user to hold the handset in a predetermined manner which can be used to enhance the operating characteristics of the radiotelephone handset particularly those related to single-handed operation of the handset.

The scooped recess improves the ergonomics of the handset. Such positioning enables the handset to be operated more comfortably by the user. It is particularly agreeable to hold the handset in one hand and operate the keys on the front face of the handset with the thumb. The natural position the hand is inclined to take when nestling a handset with a scooped recess in accordance with this embodiment of the present invention means that the alphanumeric keys and in particular the scroll key are within reach for the user's thumb as it moves naturally across the front face of the phone. No unnatural extension of the thumb along a vertical axis is required to operate the scroll key. Also, the depression of the scroll key only requires movement of the thumb from its socket and does not require any other hand movement. Hence, the handset can be held and readily operated using the same hand.

The positioning of the scroll key 9 obliquely improves the ergonomics of the handset. Such positioning enables the key to be operated more comfortably by the user. It is particularly agreeable as the two depressible elements of the scroll key are within reach of the user's thumb as it moves naturally across the front face of the phone. No unnatural extension of the thumb along a vertical axis is required. Also, the depression of these elements of the scroll key 9 only requires movement of the thumb from its socket and does not require any other hand movement. Hence, the handset can be held and the scroll key readily operated using the same hand.

Although depicted in this embodiment located partly in the rear cover of the handset and partly in the rear casing of the battery, the scooped recess 21 could, in other embodiments, be formed wholly in either. The scooped recess 21 could be larger or smaller than that depicted. The design and position of the recess is not critical, it is desirably, however, configured to accommodate finger tips of a user when holding the radiotelephone handset I to the ear during conversation. However, the position of at least a portion of the recess directly above the battery 22, makes it easier for the user to depress any release mechanism 25 for withdrawal of the battery.

In this figure, the handset comprises a user interface in the form of a single key 26 in a top corner of the rear cover 20 of the handset. This key may have a dedicated function or it may be a softkey.

For example, the key 26 may have a dedicated function, such as a voice recognition function, which enables the user to store and retrieve data from the handset's memory (e.g. phonebook function). In such a case, the user could press the key to activate the voice recognition mode. He would then give the requisite instructions/data orally, into the microphone 6, which in turn would convert them into electrical signals which the processor would then process. The processor matches instructions with predetermined stored instructions, and controls the handset accordingly. For example, if the instruction was to save, the processor would save the subsequent data input by the user either orally or via the alphanumeric keypad. Alternatively, if the command was to retrieve a phone number from the phonebook, then the processor would endeavour to match the data input by the user to a stored phone book entry. If a match occurred, data would be retrieved and would ideally be output by the loudspeaker, and may additionally be displayed on the display 3. The key 26 could then be used to verify the retrieved data is correct, and thus cause the number to be dialled. At the end of the call the user may end the call by pressing this button again.

An alternative dedicated function for this key would be a voice recording function. In this case, the user could press the key during a call to record the whole or part of a conversation (e.g. just for a period, and/or just the user's voice or just the other party's). For example, the user could press the key once to activate recording and press it a second time to end recording.

On the other hand, the key 26 may be a softkey. For example, it might provide both of the aforementioned functions, the voice recognition function when the phone is in an idle state (e.g. when a call is not in progress) and the voice recording function when a call is in progress (or at least when voice signals are received by the earpiece and/or the microphone).

FIG. 6 shows alternative user interface features on the rear of a handset. This handset comprises an user interface input 60 which manipulates the contents of the display. This input 60 may be, for example, a touch screen, a single key, an array of keys a mat having a pressure sensitive region or regions, or the like. In the embodiment shown, the user interface input 60 is a touchpad which has a plurality of pressure sensitive regions 64–66. The display has regions corresponding to these, as referenced 61–63 in FIG. 6(b). Preferably the corresponding regions of the touchpad mirror those of the display. This assists the user in accurately selecting the function shown in a particular region of the display. The input 60 may comprise regions which have a dedicated function, which operate as a softkey or a combination of both. In the example shown, the regions 65 and 66 of the touchpad have dedicated functions, namely send and end call functions as indicated in corresponding display regions 62 and 63. However, region 64 of the touchpad may operate as a softkey, for example, as the key 26 of FIG. 3 does. Its function can be indicated by an icon in the corresponding region of the display, so that the user knows which region of the rear of the handset to press to select a voice recognition function when the phone is in an idle state (e.g. when a call is not in progress) and a voice recording function when a call is in progress (or at least when voice signals are received by the earpiece and/or the microphone).

The handset also has a separate key 67. An advantage of such a key is that it can be readily found by the user during a call, without having to look at the phone's display, for example. Hence, it may be preferable to have an in call function such as voice recording function associated with this key, as opposed to (or as a short cut to) being associated with the input 60.

The provision of a user interface input 60 for manipulating the contents of a display on the rear of the handset has a number of advantages. Primarily, it enables the user to hold the handset and control the display information with one hand. It is advantageous to have a separate touchscreen to the actual display as the display will not get dirty and its content obscured by dirt or the user's hand. Moreover, in single handed use, a user interface input on the front of the phone require thumb operation, whereas such an input on the rear can be operated by a forefinger, which is much smaller and more agile than a thumb, and thus provides greater accuracy.

As will be appreciated this is important if reductions in the size of a handset is of consideration.

A further consideration is the elimination of function keys from the front of the handset, thus enabling a reduction in its length. For example, the provision of the regions 62, 63 on the display and corresponding regions 65, 66 on the touchpad 60 in FIG. 6(a) has resulted in the elimination of send and end keys (referenced 10a and b in FIG. 1) from the front face of the phone.

FIG. 7 shows a handset with an alternative user interface input 70 which manipulates data on the display, and eliminates the need for function keys on the front of the phone. In this case, the soft keys referenced 8 in FIG. 1, which are conventionally associated with menu and memory functions, have been replaced by regions 73 and 72 of the input 70, and the send and end keys 10a and 10b by single region 75. This embodiment also has a separate key 74, which may again be used for a function concerned with the processing of voice signals supplied to the audio interface of the handset, such as a voice recognition and/or recording function.

Figure 8A:
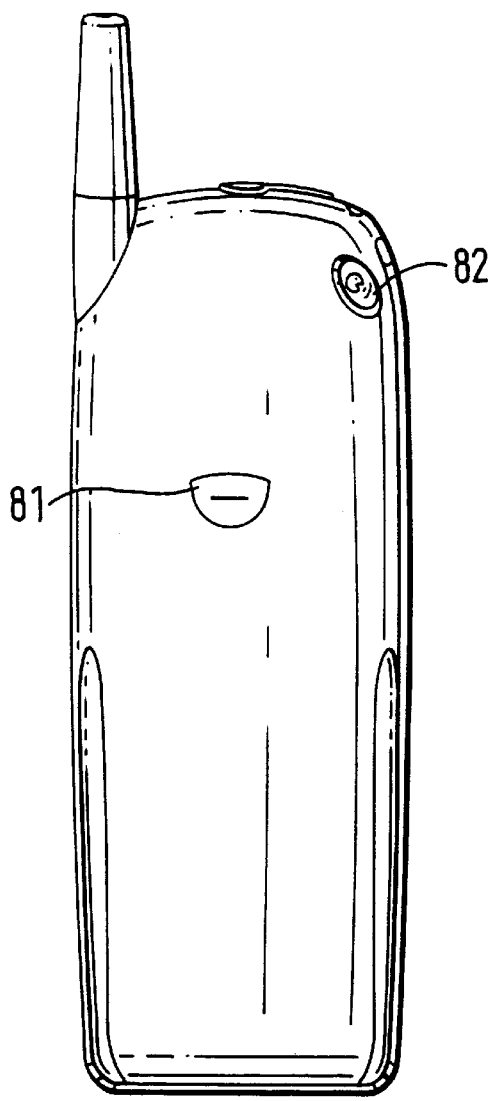
Figure 8B:
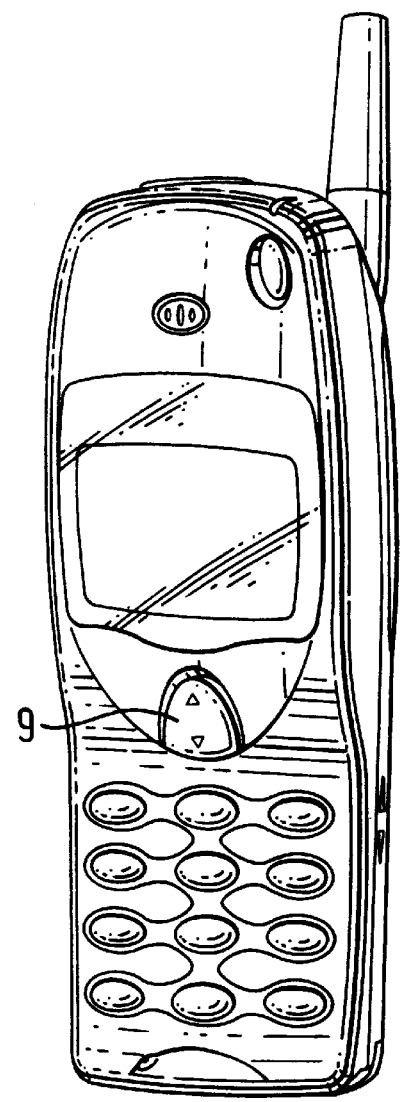
Figure 13:
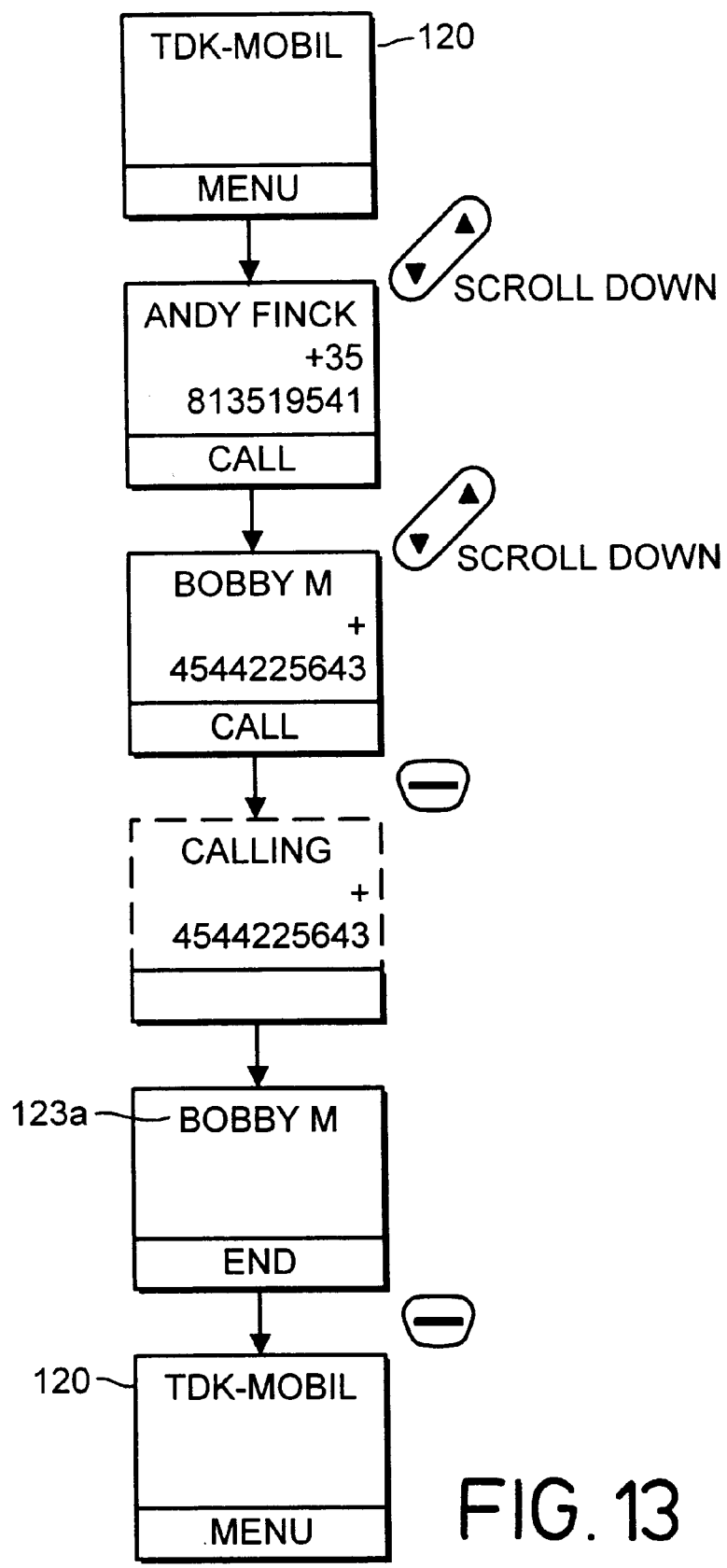
FIG. 13 illustrates the selection of a phone number from a phone book using a single softkey.
Figure 14:
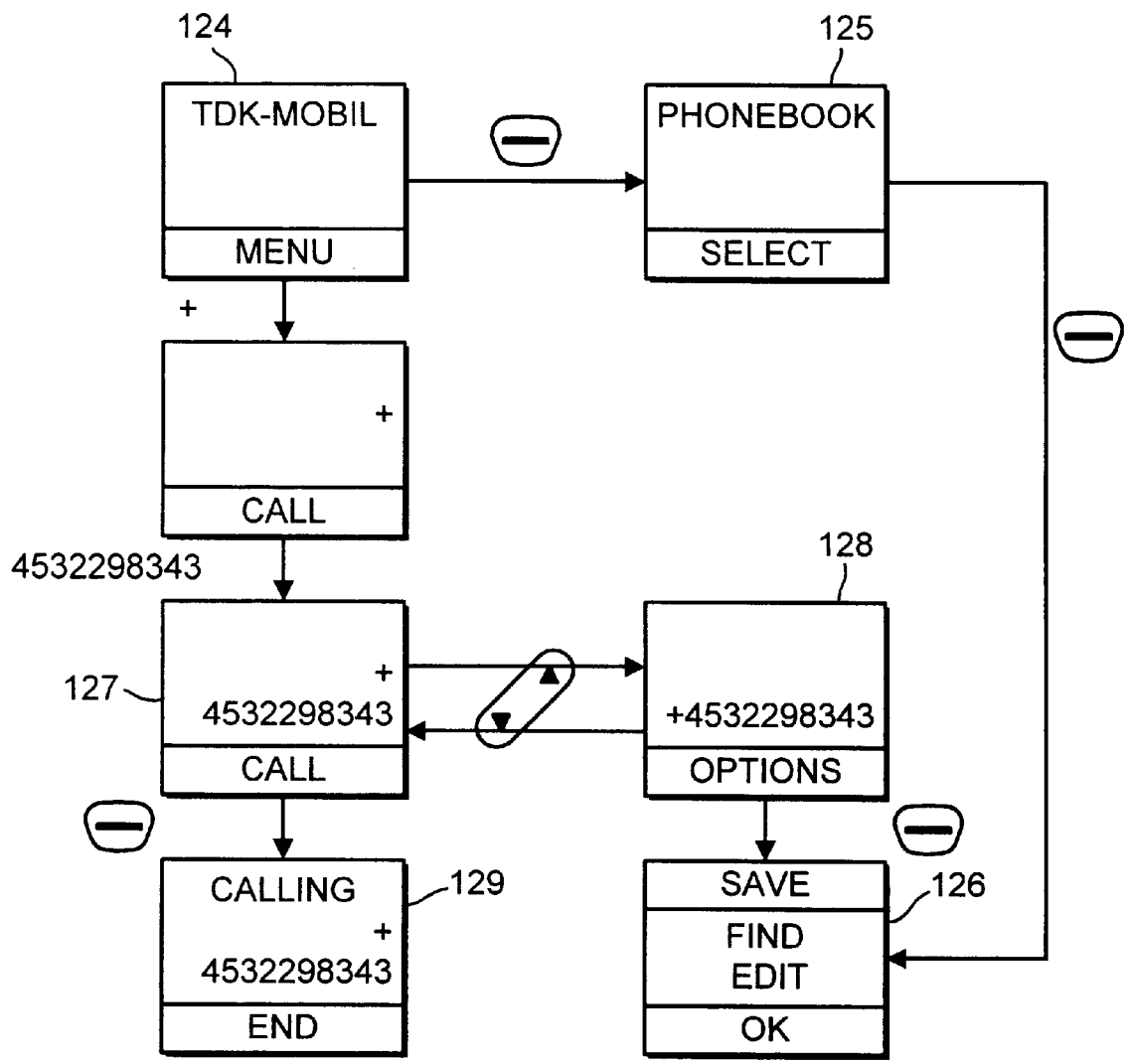
FIG. 14 illustrates scrolling an alternative menu on the display according to an embodiment of the present invention.

FIG. 8 shows an alternative user interface input on the rear of the handset. In this case, the handset comprises an operation or softkey 81 associated with the display and another key 82, which, as in the previous examples, can be a key having a dedicated function or a softkey. Again, this key 82 is ideally suited to a function or functions which might be required when the user has the handset to his face, such as during a call. The softkey 81 can be used to select the requisite menu options etc. from the display. Such operations are shown in FIGS. 12 to 14 and described below.

The processor, which serves as the controller unit in a manner known per se is connected to the user interface. Thus, it is the processor which monitors the activity in the telephone and controls the display in response thereto. Therefore, it is the processor which detects the occurrence of a state change event and changes the state of the telephone and thus the display text. A state change event may be caused by the user when he activates the keypad, which is called an entry event, and also by the network connection of the telephone or by another event beyond the user's control, which is called a non user event. Non user events comprise status change during call set-up, change in battery voltage, change in antenna conditions, message on reception of SMS, etc.

Figure 12:
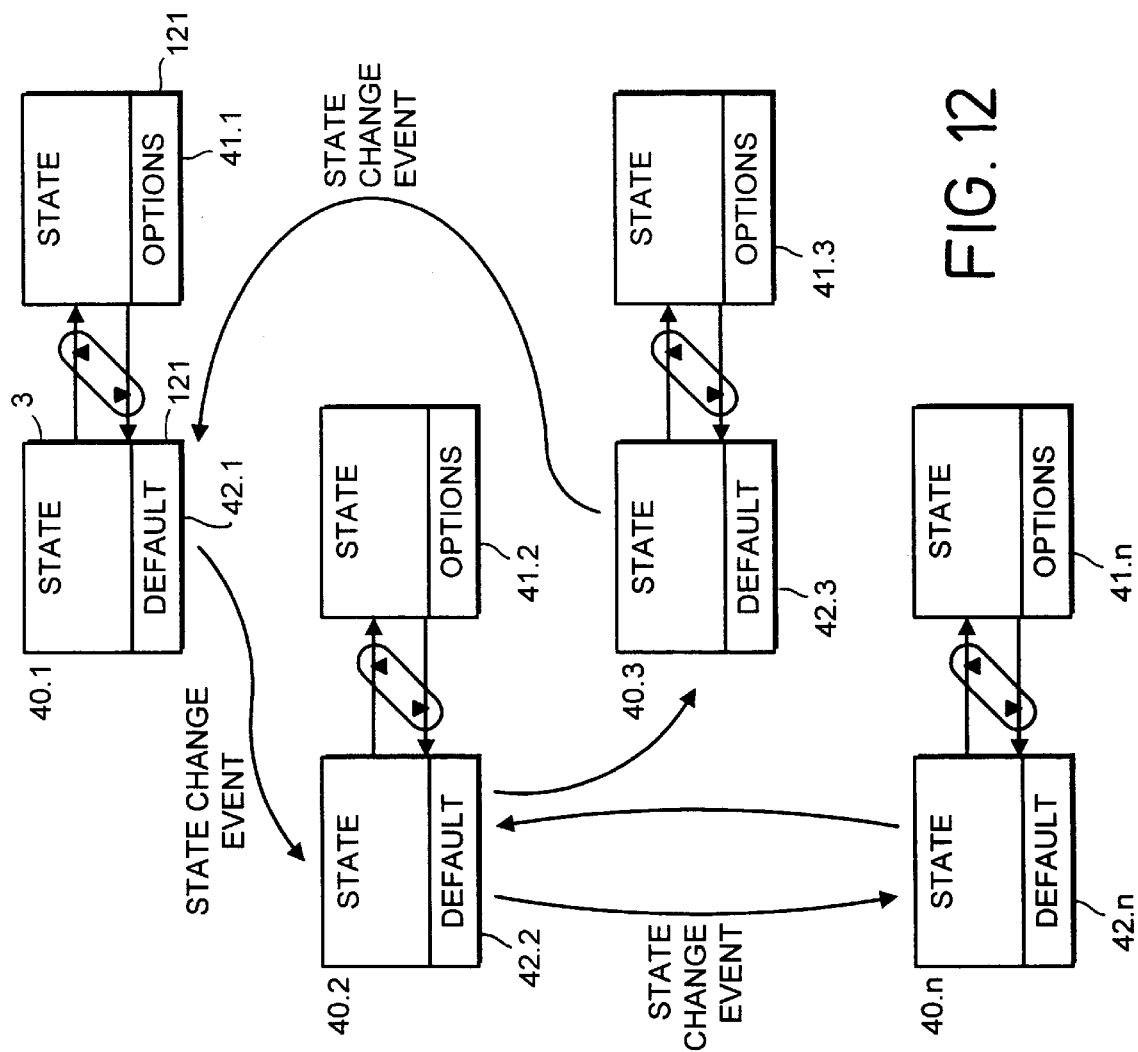
FIGS. 12 illustrates scrolling a new menu on the display using a single softkey, such as that of the handset in FIG. 8.

The use of a single soft key is based on the idea that the telephone can assume a plurality of predetermined states 40.1–40.n, which is illustrated in FIG. 12. A plurality of actions (options 41.1–41.n) may be performed in these states 40.1–40.n. The display image at arrival to state 40.1 may be a telephone number or the name of a person contained in the phonebook of the telephone, which is indicated by "state". "State" might also cover "incoming calls", "E-mail received", "SMS received", etc. If the display contains a telephone number, the default function 42.1–42.n might be "call". The scroll key 9 allows scrolling from the default function to the group of possible functions, to which the default function belongs. Preferably, the scroll key 9 scrolls between the default function and the group of possible functions (options), but switches to scrolling between items in the group of possible functions, once this group has been selected by means of the soft key 81. The state is maintained during such operations.

As can be seen from FIG. 12, a state change event will result in a change from one state to another. The new state depends on the old state and the nature of the state change event. During an established call ("call established" state), the default function of the soft key 81 will according to the preferred embodiment be "end". If a new incoming call "is waiting", the user may use the scroll key 9 to scroll the option list including items such as "end", "join", "answer" and "swap" onto the display without interrupting the call.

Each state 40.1–40.n is associated with a predefined group of functions, actions or options 41.1–41.n, which are possible precisely for that state. A preferred function serving as the default function 42.1–42.n is designated in each of these groups. This designation may be performed by the programmer during programming, by the user through his redefinition of the default function, or by the telephone itself in that it records the frequency of the use of the individual functions and appoints the most frequently used one in each group as the default function—optionally with the user's acceptance.

When the telephone changes its state, the soft key 81 can perform the default function if it is activated, and the user may scroll between the default function and the whole group of options by means of the scroll key 9. If the group of options is selected with the soft key, the user is able to scroll through the group of options with the scroll key and to select the desired (designated) function with the soft key.

When a function is selected with the soft key 81, the processor runs the associated program sequence to execute the function. FIG. 13 shows the role of the soft key 81 to select a phone number from an address book according to a preferred embodiment of the invention. The display text is simultaneously indicated with the keys of the keypad which have been activated (or in response to voice in a voice recognition system). The display 3 has a display image 120 ("idle mode" state) which shows the function of the soft key 8 as a highlighted bar in a predetermined area (soft key display) 121 of the display. The function of the soft key 81 in the idle mode in this embodiment is to gain access to the main menu loop of the telephone. The upper part of the display 120 shows an identification of the network operator concerned (here TDK-MOBIL). The display may additionally contain an indicator of the antenna signal strength and a battery voltage indicator. These are not shown in the figures, as they have no importance to the description of the default function.

When the soft key 81 is activated establishment of a call is attempted, which causes the telephone to change to a "call established state" under the control of the processor, and the new function "end" of the soft key 81 is now displayed in the soft key display 121. It is shown at the same time in the display that it is attempted to establish a call, which is done by the indication "calling . . . ". The number to which the connection is to be established is still displayed in the main area 123 of the display.

The scroll key 9 is used at the idle mode display image 120 stage to gain access to the phonebook of the telephone under the main menu loop. This causes the telephone number and the name code of the first storage location in the phonebook to be displayed in the display. The telephone changes to the "number handling state", and the new default function "call" of the soft key 81 is now displayed in the soft key display 121. By continued use of the scroll key 9 the user will be able to scroll through the phonebook until he finds the number he wants. As the soft key 81 maintains its "call" function as the default function, the call can still be established by depression of the soft key 81. Then, the call can be established and terminated as follows.

When the call has been established, this can be indicated by displaying "connected" at the top of the display and by an indication of the telephone by means of which the call has been established. The identification in this instance is a name code 123a. The default function of the soft key 81 will still be "end", which is shown in the soft key display 121. If the soft key 81 is activated once more, the call will be interrupted, and the telephone will return to the "idle mode state" with the idle mode display image 120.

FIG. 14 shows the use of the soft key 81 to select an alternative menu onto the display. The "idle mode state" with the display image 124 (idle mode display) can be changed to a main menu 125 by activating the soft key 81. Here, access to the phonebook is presented as default. If the user selects this, he may choose between the individual submenu items in the phonebook shown on the display by image 126. If, alternatively whilst in the "idle mode state", the user had instead begun to enter a telephone number, the telephone would have changed to a "number handling state" with a display image 127 with "call" as the default function. The user may in this case switch to possible functions in this state (display image 128) by scrolling such functions on the display using the scroll key 9. These functions comprise the submenu items (display image 126) of the phonebook, and the requisite one may be selected by scrolling the cursor to highlight it and then pressing the soft key 81. If, instead, the user had selected the default function in the "number handling state", the telephone would have started establishment of a call (display image 129).

Figure 9A:
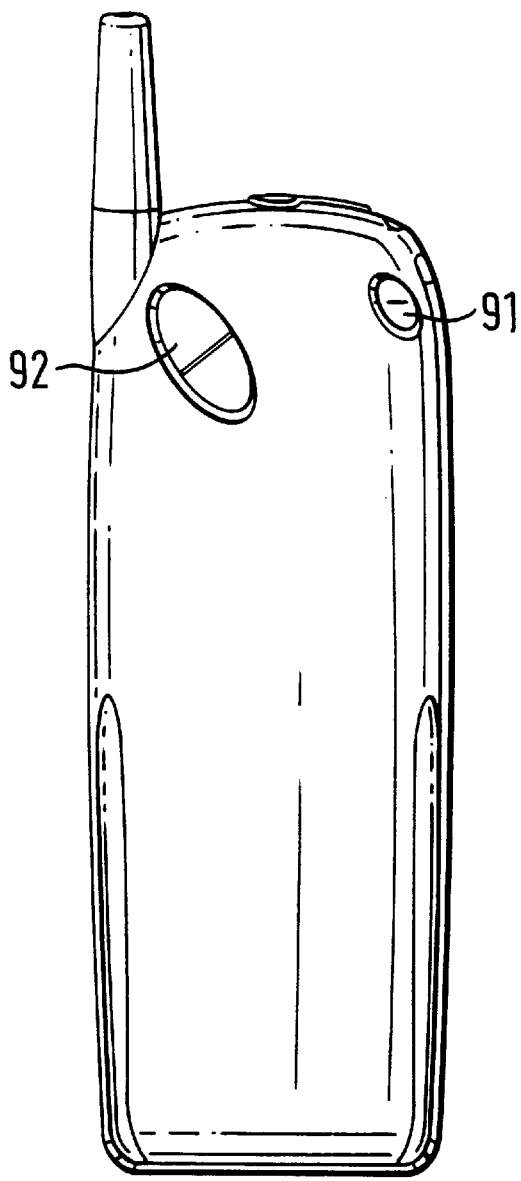
Figure 9B:
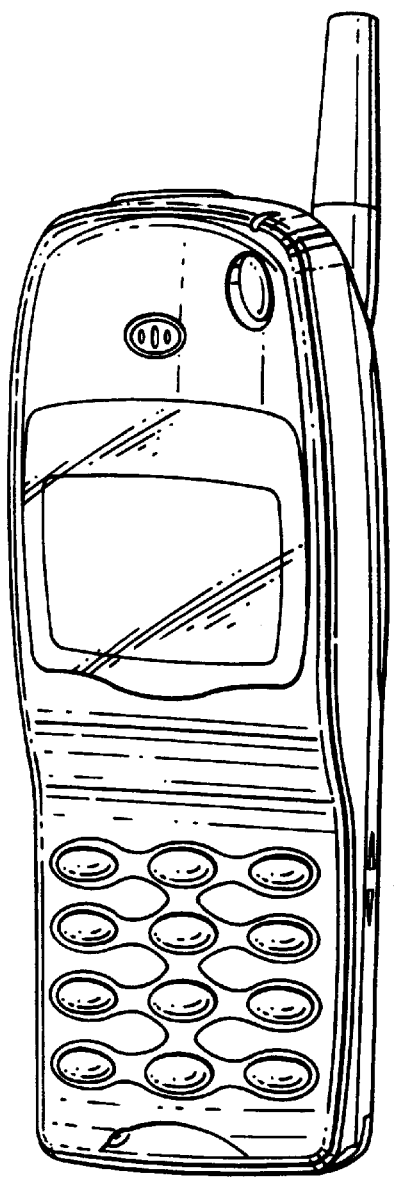

In FIG. 8, the scroll key 9 is on the front face of the phone. However, alternatively it could be placed on the rear of the phone so as to minimise the number of function keys required and to eliminate them totally from the front face of the phone. One such arrangement can be seen in FIG. 9, which shows a single soft key 91 and a scroll key 92 on the rear face of the handset. The scroll key is slanted so as to improve the ergonomics of the handset and make it more comfortable for the user's index finger, as described above with respect to the user's thumb when the key is on the front face.

Figure 10:
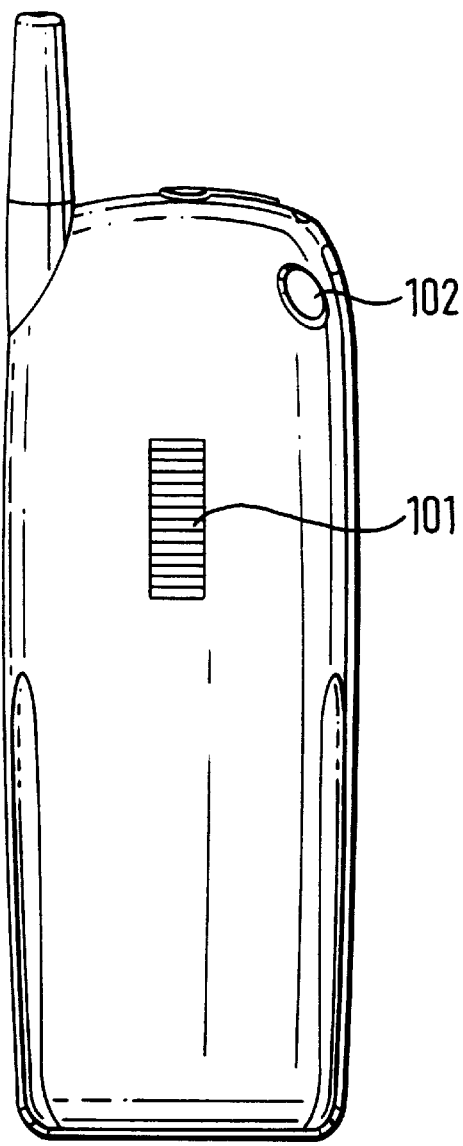
Figure 11:
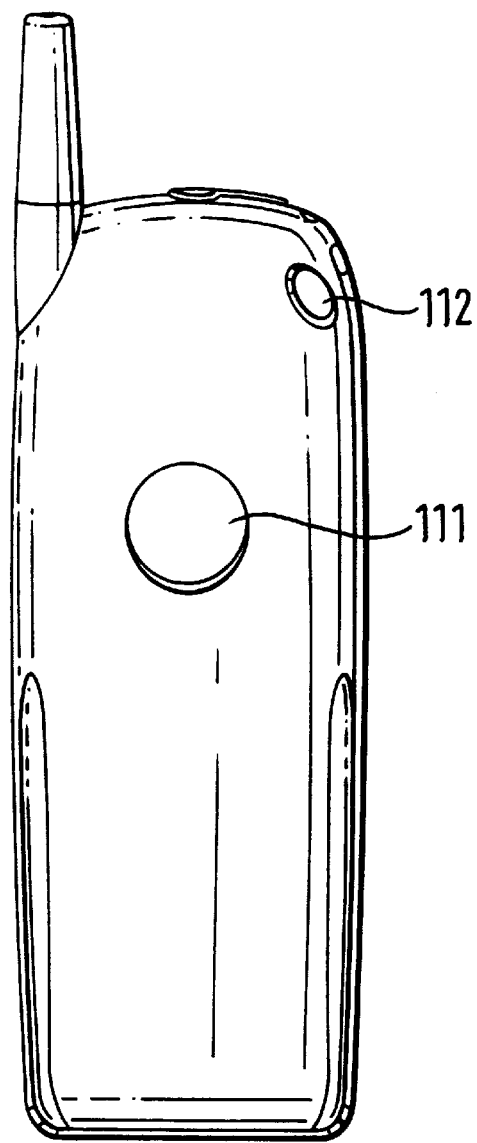

FIGS. 10 and 11 show alternative user interface input means on the rear face of a handset. They have finger actuable rolling means 101, 111 which control the menu options on the display. FIG. 10 shows a finger wheel which can provide scrolling action in two directions along a single axis and FIG. 11 shows a finger ball which can provide a scrolling action along further axes. Manipulation of the display is achieved under processor control in accordance with control signals corresponding to the direction and speed of rotation of the rolling means. This is explained in further detail in EP0463856. The menu options can be selected either by pressing on the rolling means or by pressing a separate key 102,112.

In view of the foregoing description, it will be evident to a person skilled in the art that various modifications may be made within the scope of the claims.

What is claimed is:

1. A radiotelephone handset comprising:
   a housing having a front and a rear face; and
   a user interface comprising a display and input means responsive to a user to manipulate the contents of the display;
   wherein the display is provided on the front face and the input means is provided on the rear face, wherein the input means comprises a selector for selecting a function displayed in an associated region of the display, and wherein the selector is positioned substantially directly behind the associated region of the display.

2. A radiotelephone handset comprising:
   a housing having a front and a rear face; and
   a user interface comprising a display and input means responsive to a user to manipulate the contents of the display;
   wherein the display is provided on the front face and the input means is provided on the rear face and wherein the input means is positioned substantially directly behind the display.

3. A radiotelephone handset as claimed in claim 2, wherein the input means manipulates text.

4. A radiotelephone handset as claimed in claim 2, wherein the input means manipulates a cursor.

5. A radiotelephone handset as claimed in claim 4, wherein the cursor is a highlighter.

6. A radiotelephone handset as claimed in claims 2, wherein the input means manipulates a function displayed on the display.

7. A radiotelephone handset as claimed in claim 6, wherein the input means comprises a selector for selecting a function displayed on the display.

8. A radiotelephone handset as claimed in claim 2, wherein the input means comprises a touchpad.

9. A radiotelephone handset as claimed in claim 8, wherein the touchpad comprises a plurality of regions, wherein each said region is responsive to the user to manipulate the contents of an associated region of the display.

10. A radiotelephone as claimed in claim 9, wherein each touchpad region is positioned behind its associated display region.

11. A radiotelephone as claimed in claim 9, wherein at least one of the touchpad regions is responsive to the user to select a function displayed in an associated display region.

12. A radiotelephone handset as claimed in claim 11, wherein the function displayed in a display region is selected in response to pressure being removed from the associated touchpad region.

13. A radiotelephone handset as claimed in claim 11, wherein the function displayed in a display region is selected in response to pressure being applied to the associated touchpad region.

14. A radiotelephone handset as claimed in claim 2, wherein the input means comprises rolling means actuable by a user's finger to manipulate the contents of the display.

15. A radiotelephone handset as claimed in claim 14, wherein the rolling means is a finger wheel.

16. A radiotelephone handset as claimed in claim 14, wherein the rolling means is a finger ball.

17. A radiotelephone handset as claimed in claim 2, wherein the input means comprises a key.

18. A radiotelephone handset as claimed in claim 2, wherein the input means scrolls contents of the display.

* * * * *